US008346555B2

(12) United States Patent
Metz

(10) Patent No.: US 8,346,555 B2
(45) Date of Patent: Jan. 1, 2013

(54) AUTOMATIC GRAMMAR TUNING USING STATISTICAL LANGUAGE MODEL GENERATION

(75) Inventor: Brent D. Metz, Delray Beach, FL (US)

(73) Assignee: Nuance Communications, Inc., Burlington, MA (US)

(*) Notice: Subject to any disclaimer, the term of this patent is extended or adjusted under 35 U.S.C. 154(b) by 1114 days.

(21) Appl. No.: 11/466,223

(22) Filed: Aug. 22, 2006

(65) Prior Publication Data

US 2008/0052076 A1    Feb. 28, 2008

(51) Int. Cl.
*G10L 15/18* (2006.01)
*G10L 15/00* (2006.01)
*G10L 15/26* (2006.01)
*G06F 17/27* (2006.01)

(52) U.S. Cl. ............. 704/257; 704/9; 704/235; 704/240
(58) Field of Classification Search ............... 704/9, 240, 704/257, 235, 244; 379/88.22
See application file for complete search history.

(56) References Cited

U.S. PATENT DOCUMENTS

| 4,477,698 A | 10/1984 | Szlam et al. |
| 4,729,096 A | 3/1988 | Larson |
| 4,736,296 A | 4/1988 | Katayama et al. |
| 4,914,590 A | 4/1990 | Loatman et al. |
| 4,965,763 A | 10/1990 | Zamora |
| 5,101,349 A | 3/1992 | Tokuume et al. |
| 5,239,617 A | 8/1993 | Gardner et al. |
| 5,253,164 A | 10/1993 | Holloway et al. |
| 5,282,265 A | 1/1994 | Rohra Suda et al. |
| 5,325,293 A | 6/1994 | Dorne |
| 5,327,341 A | 7/1994 | Whalen et al. |
| 5,383,121 A | 1/1995 | Letkeman |
| 5,386,556 A | 1/1995 | Hedin et al. |
| 5,390,279 A | 2/1995 | Strong |
| 5,392,209 A | 2/1995 | Eason et al. |
| 5,544,360 A | 8/1996 | Lewak et al. |
| 5,642,519 A | 6/1997 | Martin |
| 5,664,109 A | 9/1997 | Johnson et al. |

(Continued)

FOREIGN PATENT DOCUMENTS

WO    WO 99/05671    2/1999

OTHER PUBLICATIONS

"Hardware Reference Manual" Release 3 for DOS, revised Jan. 1994, PIKA Technologies, Inc. Ontario Canada, http://www.pikatechnologies.com/downloads/legacy/AVA%20B-Series%20Hardware%20Manual.pdf. (accessed Jul. 25, 2005).

(Continued)

*Primary Examiner* — Talivaldis Ivars Smits
*Assistant Examiner* — Farzad Kazeminezhad
(74) *Attorney, Agent, or Firm* — Wolf, Greenfield & Sacks, P.C.

(57) ABSTRACT

The present invention discloses a speech processing solution that utilizes an original speech recognition grammar in a speech recognition system to perform speech recognition operations for multiple recognition instances. Instance data associated with the recognition operations can be stored. A replacement grammar can be automatically generated from the stored instance data, where the replacement grammar is a statistical language model grammar. The original speech recognition grammar, which can be a grammar-based language model grammar or a statistical language model grammar, can be selectively replaced with the replacement grammar. For example when tested performance for the replacement grammar is better than that for the original grammar, the replacement grammar can replace the original grammar.

24 Claims, 2 Drawing Sheets

U.S. PATENT DOCUMENTS

| | | | |
|---|---|---|---|
| 5,677,835 | A | 10/1997 | Carbonell et al. |
| 5,678,052 | A | 10/1997 | Brisson |
| 5,748,841 | A | 5/1998 | Morin et al. |
| 5,799,268 | A | 8/1998 | Boguraev |
| 5,809,476 | A | 9/1998 | Ryan |
| 5,812,977 | A | 9/1998 | Douglas |
| 5,832,450 | A | 11/1998 | Myers et al. |
| 5,845,047 | A | 12/1998 | Fukada et al. |
| 5,864,819 | A | 1/1999 | DeArmas et al. |
| 5,867,817 | A | 2/1999 | Catallo et al. |
| 5,873,064 | A | 2/1999 | DeArmas et al. |
| 5,905,773 | A | 5/1999 | Wong |
| 5,918,222 | A | 6/1999 | Fukui et al. |
| 5,937,385 | A | 8/1999 | Zadrozny et al. |
| 5,960,384 | A | 9/1999 | Brash |
| 5,970,463 | A | 10/1999 | Cave et al. |
| 6,014,663 | A | 1/2000 | Rivette et al. |
| 6,021,202 | A | 2/2000 | Anderson et al. |
| 6,023,669 | A | 2/2000 | Suda et al. |
| 6,044,347 | A | 3/2000 | Abella et al. |
| 6,052,693 | A | 4/2000 | Smith et al. |
| 6,055,494 | A | 4/2000 | Friedman |
| 6,073,102 | A | 6/2000 | Block |
| 6,088,437 | A | 7/2000 | Amick |
| 6,138,100 | A | 10/2000 | Dutton et al. |
| 6,154,722 | A | 11/2000 | Bellegarda |
| 6,182,029 | B1 | 1/2001 | Friedman |
| 6,188,976 | B1 | 2/2001 | Ramaswamy et al. |
| 6,192,110 | B1 | 2/2001 | Abella et al. |
| 6,192,112 | B1 | 2/2001 | Rapaport et al. |
| 6,192,339 | B1 | 2/2001 | Cox |
| 6,208,972 | B1 | 3/2001 | Grant et al. |
| 6,233,559 | B1 | 5/2001 | Balakrishnan |
| 6,292,771 | B1 | 9/2001 | Haug et al. |
| 6,311,159 | B1 | 10/2001 | Van Tichelen et al. |
| 6,314,402 | B1 | 11/2001 | Monaco et al. |
| 6,334,103 | B1 | 12/2001 | Surace et al. |
| 6,347,329 | B1 | 2/2002 | Evans |
| 6,405,165 | B1 | 6/2002 | Blum et al. |
| 6,434,547 | B1 | 8/2002 | Mishelevich et al. |
| 6,438,533 | B1 | 8/2002 | Spackman et al. |
| 6,466,654 | B1 | 10/2002 | Cooper et al. |
| 6,484,136 | B1 | 11/2002 | Kanevsky et al. |
| 6,505,162 | B1 | 1/2003 | Wang et al. |
| 6,519,562 | B1 | 2/2003 | Phillips et al. |
| 6,542,868 | B1 | 4/2003 | Badt et al. |
| 6,553,385 | B2 | 4/2003 | Johnson et al. |
| 6,604,075 | B1 | 8/2003 | Brown et al. |
| 6,647,363 | B2 | 11/2003 | Claassen |
| 6,721,706 | B1 | 4/2004 | Strubbe et al. |
| 6,728,692 | B1 | 4/2004 | Martinka et al. |
| 6,748,361 | B1 | 6/2004 | Comerford et al. |
| 6,895,084 | B1* | 5/2005 | Saylor et al. ............... 379/88.22 |
| 6,915,254 | B1 | 7/2005 | Heinze et al. |
| 6,947,936 | B1 | 9/2005 | Suermondt et al. |
| 6,999,931 | B2 | 2/2006 | Zhou |
| 7,031,908 | B1* | 4/2006 | Huang et al. ...................... 704/9 |
| 7,120,582 | B1 | 10/2006 | Young et al. |
| 7,124,144 | B2 | 10/2006 | Christianson et al. |
| 7,200,559 | B2* | 4/2007 | Wang ............................ 704/257 |
| 7,813,926 | B2* | 10/2010 | Wang et al. ................... 704/245 |
| 2002/0007285 | A1 | 1/2002 | Rappaport |
| 2002/0095313 | A1 | 7/2002 | Haq |
| 2002/0128831 | A1 | 9/2002 | Ju et al. |
| 2002/0143824 | A1 | 10/2002 | Lee et al. |
| 2002/0169764 | A1 | 11/2002 | Kincaid et al. |
| 2003/0046264 | A1 | 3/2003 | Kauffman |
| 2003/0061201 | A1 | 3/2003 | Grefenstette et al. |
| 2003/0115080 | A1 | 6/2003 | Kasravi et al. |
| 2003/0200094 | A1 | 10/2003 | Gupta et al. |
| 2003/0208382 | A1 | 11/2003 | Westfall |
| 2003/0233345 | A1 | 12/2003 | Perisic et al. |
| 2004/0085162 | A1 | 5/2004 | Agarwal et al. |
| 2004/0098263 | A1 | 5/2004 | Hwang et al. |
| 2004/0103075 | A1 | 5/2004 | Kim et al. |
| 2004/0139400 | A1 | 7/2004 | Allam et al. |
| 2004/0186746 | A1 | 9/2004 | Angst et al. |
| 2004/0220895 | A1 | 11/2004 | Carus et al. |
| 2004/0243545 | A1 | 12/2004 | Boone et al. |
| 2004/0243551 | A1 | 12/2004 | Boone et al. |
| 2004/0243552 | A1 | 12/2004 | Titemore et al. |
| 2004/0243614 | A1 | 12/2004 | Boone et al. |
| 2005/0108010 | A1 | 5/2005 | Frankel et al. |
| 2005/0114122 | A1 | 5/2005 | Uhrbach et al. |
| 2005/0120020 | A1 | 6/2005 | Carus et al. |
| 2005/0120300 | A1 | 6/2005 | Schwager et al. |
| 2005/0144184 | A1 | 6/2005 | Carus et al. |
| 2005/0154580 | A1 | 7/2005 | Horowitz et al. |
| 2005/0165598 | A1 | 7/2005 | Cote et al. |
| 2005/0165602 | A1 | 7/2005 | Cote et al. |
| 2005/0192792 | A1 | 9/2005 | Carus et al. |
| 2005/0192793 | A1 | 9/2005 | Cote et al. |
| 2005/0207541 | A1 | 9/2005 | Cote |
| 2005/0228815 | A1 | 10/2005 | Carus et al. |
| 2005/0261901 | A1* | 11/2005 | Davis et al. ................... 704/235 |
| 2006/0074671 | A1 | 4/2006 | Farmaner et al. |
| 2006/0265366 | A1* | 11/2006 | Winkelman et al. .............. 707/3 |
| 2007/0219793 | A1* | 9/2007 | Acero et al. ................... 704/240 |

OTHER PUBLICATIONS

"Customizing D/41 Call Analysis" date unknown, Intel Corp., Santa Clara California, http://resource.intel.com/telecom/support/appnotes/custd41d.htm, accessed Jul. 25, 2005.

Song, et al. A Graphical Interface to a Semantic Medical Information system, Journal of Foundations of Computing and Decision Sciences, 22(2), 1997.

Song et al. A Cognitive Model for the Implementation of Medical Problem Lists, Proceedings of the First Congress on Computational Medicine, Public Health and Biotechnology, Austin, Texas, 1994.

Song et al., A Graphical Interface to a Semantic Medical Information System, Karp-95 Proceedings of the Second International Symposium on Knowledge Acquisition, Representation and Processing, pp. 107-109, 1995.

Epic Web Training Manual, pp. 1-33, 2002.

Hieb, Research Note, NLP Basics for Healthcare, Aug. 16, 2002.

Shalizi et al., Pattern Discovery in Time Series, Part 1: Theory, Algorithm, Analysis, and Convergence, Journal of Machine Learning Research, 2002.

Nevill-Manning et al., The Development of Holte's 1R Classifier, Department of Computer Science, 1995.

Cutting, et al. A Practical Part-of-Speech Tagger, Xerox Palo Alto Research Center.

Zavrel et al. Recent Advances in Memory-Based Part-of-Speech Tagging, ILK/Computational Linguistics.

Brill, Some Advances in Transformation-Based Part of Speech Tagging, Spoken Language Systems Group, 1994.

Nivre, DAC723: Language Technology Finite State Morphology, Vaxjo Universit of Mathematics and Systems Engineering, p. 1/11.

Creutz, Morphology and Finite-State Transducers, Oct. 31, 2001, Chap. 3, Jurafsky and Martin, 2001.

http://www.comp.lancs.ac.uk/computing/research/stemming/general/index.htm printed Jul. 19, 2004.

http://www.comp.lancs.ac.uk/comuting/research/stemming/general/stemmingerrors.htm printed Jul. 19, 2004 http://www.comp.lancs.acs.uk/computing/research/stemming/general/performance.htm printed Jul. 19, 2004.

Lee et al., Cleansing Data for Mining and Warehousing, Lecture Notes in Computer Science, vol. 1677 archive, Proceedings of the 10th International Conference on Database and Expert Systems Applications, pp. 751-760, Springer-Verlag., London 1999.

Van Rijsbergen, Information Retrieval, 2nd ed. Ch. 5, Butterworths, London, 1979.

Day, Extracting Knowledge from Text Using Learning by Constraint Relaxation (LCR), CSI, www.csi-inc.com/CSI/pdf/jday_icim02.pdf.

Gale, et al., Discrimination Decisions for 100,000-Dimensional Spaces, Current Issues in Computational Lingistics, pp. 429-450, Kluwer Academic Publishers, 1994.

Daelmans et al. TiMBL: Tilburg Memory Based Learner, v.5.0, Reference Guide, ILK Research Group Technical Report Series No. 04-02 (ILK-0402) ILK Research Group, Tilburg University, Tilburg, Netherlands 2004.

Case Study: Massachusetts Medical Society http://www.microsoft.com/resources/casestudies/CaseStudy.asp?CaseStudyID=14931 posted Jan. 13, 2004.

Braithewaite, Continuity of Care Record (CCR) http://www.h17.org/library/himss/2004Orlando/ContinuityofCareRecord.pdf, 2004.

Waegemann, HER vs. CCR: What is the difference between the electronic health record and the continuity of care record?, Medical Records Institute, 2004.

Press Release: Kryptiq Announces Support of CCR Initiative and Introduces New Solutions that Enable Information Portability, Accessibility and Clinical System Interoperability, http://kryptiq.com/News/PressReleases/27.html posted Feb. 17, 2004.

Work Item Summary: WK4363 Standard Specification for the Continuity of Care Record (CCR), http://www.astm.org/cgi-bin/SoftCart.exe/DATABASE,CART/WORKITEMS/WK4363.htm?E+mystore Mar. 3, 2004.

Continuity of Care Record (CCR): The Concept Paper of the CCR, v. 2.1b, http://www.bhtinfo.com/CCR.Concept%20Paper.1.5.doc.

Continuity of Care Record, American Academy of Family Physicians, http://www.aafp.org/x24962.xml?printxml posted Nov. 12, 2003.

McGlashan, S., "Towards Multimodal Dialog Management," Proceedings of Twente Workshop on Language Technology 11, pp. 1-10, (Jun. 1996).

MSDN Online Web Workshop, Active Accessibility Support [online], [p. last updated Nov. 15, 2000, retrieved on May 16, 2001]. Retrieved from the Internet (URL: http://msdn.microsoft.com/workshop/browser/accessibility/overview/overview.asp) (6 pages).

Spoken Language Dialog Systems, pp. 1-2, (Nov. 15, 2000). http://www.mriq.edu.au/ltg/slp803D/class/Jones/overview.html (downloaded May 16, 2001).

Carasik, et al., "Towards a Domain Description Grammar: An Application of Linguistic Semantics" ACM SIGSOFT, Software Engineering Notes, pp. 28-43, (Oct. 1990).

Kamm, et al. "Design and Evaluation of Spoken Dialog Systems," Proc. 1997 IEEE Workshop on Speech Recognition and Understanding, pp. 11-18 (1997).

Young, et al. "Layering Predicitions: Flexible Use of Dialog Expectation in Speech Recognition," IJCAI, pp. 1543-1549, (1998).

Yound, et al. "High Level Knowledge Sources in Usable Speech Recognition Systems," Communications of the ACM, 32(2): 183-194, (Feb. 1989).

* cited by examiner

AUTOMATIC GRAMMAR TUNING USING STATISTICAL LANGUAGE MODEL GENERATION

BACKGROUND

1. Field of the Invention

The present invention relates to the field of speech recognition, and, more particularly, to automatic grammar tuning using statistical language model generation.

2. Description of the Related Art

Speech recognition systems often use one or more language models to improve speech recognition accuracy. Language models provide information concerning a likelihood that various words or phrases will be used in combination with each other. Two basic types of language models include statistical language models and grammar-based language models.

A statistical language model is a probabilistic description of the constraints on word order found in a given language. Most current statistical language models are based on the N-gram principle, where the probability of the current word is calculated on the basis of the identities of the immediately preceding (N-1) words. A statistical language model grammar is not manually written, but is trained from a set of examples that models expected speech, where the set of examples can be referred to as a speech corpus. One significant drawback to statistical language model grammars is that a size of a speech corpus for generating a statistical language model grammar can be very large. A reasonably sized speech corpus can, for example contain over twenty thousand utterances or can contain five thousand complete sentences. A cost incurred to obtain this speech corpus can be prohibitively high.

A grammar-based language model manually specifies a set of rules that are written in a grammar specification language, such as the NUANCE Grammar Specification Language (GSL), a Speech Recognition Grammar Specification (SRGS) complaint language, a JAVA Speech Grammar Format (JSGF) compliant language, and the like. Using the grammar specification language, a set of rules is constructed that together define what may be spoken.

Performance of grammar-based language models can be significantly improved by tuning the grammars, where grammar tuning is a process of improving speech recognition accuracy by modifying speech grammar based on an analysis of its performance. Grammar tuning is often performed during an iterative period of usability testing and application improvement. Grammar tuning often involves amending an existing grammar with commonly spoken phrases, removing highly confusable words, and adding additional ways that a speaker may pronounce a word. For example, cross-wording tuning can fix utterances that contain words which run together. Adding representative probabilities to confusion pairs can correct substitution errors.

Conventionally implemented grammar tuning typically involves manually tuning efforts, which can involve specialized skills. Manual tuning can be an extremely time consuming activity that can take longer than is practical for a development effort. Further, conventional grammar tuning requires access to a grammar source code which may not be available.

SUMMARY OF THE INVENTION

The present invention provides an automatic grammar tuning solution, which selectively replaces an original grammar with an automatically generated statistical language model grammar, referred to as a replacement grammar. The original grammar can be a statistical language model grammar or can be a grammar-based language model grammar. The speech corpus used to create the replacement grammar can be created from logged data. The logged data can be obtained from speech recognition runs that utilized the original grammar. After the replacement grammar is generated, a performance analysis can be performed to determine whether performance of the replacement grammar represents an improvement over the performance of the original grammar. When it does, the original grammar can either be automatically and dynamically replaced with the replacement grammar or an authorized administrator can be presented with an option to replace the original grammar with the replacement grammar.

The present invention can be implemented in accordance with numerous aspects consistent with material presented herein. For example, one aspect of the present invention can include a grammar tuning method. The method can utilize an original speech recognition grammar in a speech recognition system to perform speech recognition operations for multiple recognition instances. Instance data associated with the recognition operations can be stored. A replacement grammar can be automatically generated from the stored instance data, where the replacement grammar is a statistical language model grammar. The original speech recognition grammar, which can be a grammar-based language model grammar or a statistical language model grammar, can be selectively replaced with the replacement grammar. For example, when tested performance for the replacement grammar is better than that for the original grammar the replacement grammar can replace the original grammar.

Another aspect of the present invention can include a method for tuning speech recognition grammars. The method can perform speech-to-text operations using an original speech recognition grammar. The original speech recognition grammar can be a grammar-based language model grammar. Data for recognition instances associated with the speech-to-text operations can be stored. A set of words and phrases can be created from the recorded recognition data. A replacement grammar can be automatically generated from the set of words and phrases. This replacement grammar can be a statistical language model grammar. The original speech recognition grammar car be selectively replaced with the replacement grammar.

Still another aspect of the present invention can include a speech recognition system, which includes a language model processor, a log data store, a statistical language model generator, and a grammar swapper. The language model processor can utilize an original speech recognition grammar in performing speech recognition operations. The log data store can store speech instance data associated with the speech recognition operations. The statistical language model generator can automatically generate a replacement grammar from the speech instance data. The grammar swapper can selectively replace the original speech recognition grammar with the speech replacement grammar.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
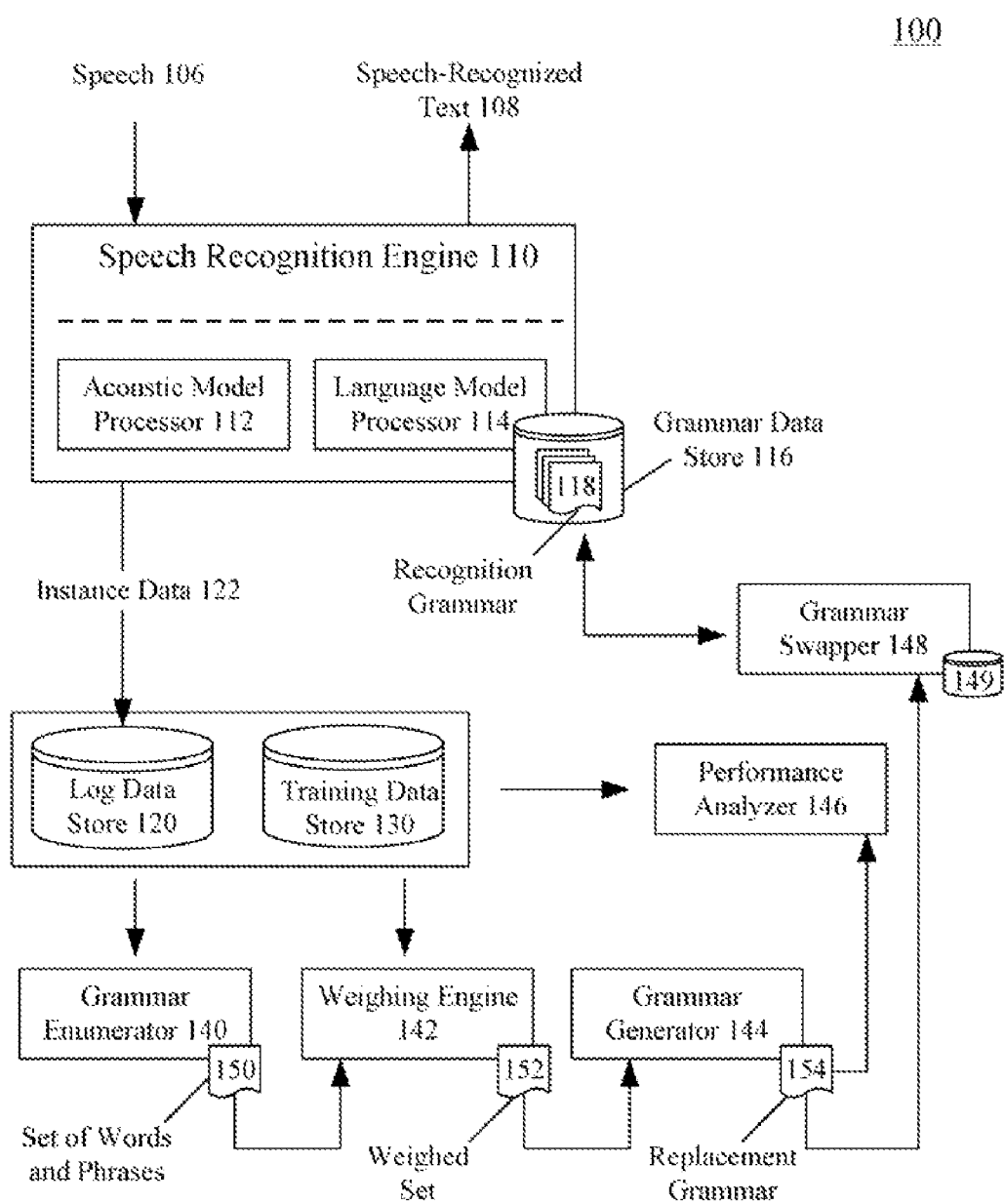
FIG. 1 is a schematic diagram of a system for automatic grammar tuning using statistical language model generation in accordance with an embodiment of the inventive arrangements disclosed herein.

FIG. 1 is a schematic diagram of a system 100 for automatic grammar tuning using statistical language model generation in accordance with an embodiment of the inventive arrangements disclosed herein. Unlike traditional implementations that attempt to tune an existing or original speech recognition grammar 118 by iteratively adjusting parameters of the original grammar 118, system 100 can automatically generate a replacement grammar 154. The replacement grammar 154 can be as statistical language model grammar automatically built from logged data contained in data store 120 and/or from training data from a data store 130. Performance for the replacement grammar 154 can be compared against performance of the original grammar 118. When performance of the replacement grammar 154 is greater than that of the original grammar system 100 can optionally replace the original grammar 118 with the replacement grammar 154, thereby "tuning" the grammar.

More specifically, the speech recognition engine 110 can convert received speech 106 into speech recognized text 108, using an acoustic model processor 112 and a language model processor 114. The language model processor 114 can utilize words, phrases, weights, and rules defined by an original grammar 118. The language processor 114 can be configured to handle grammar-based language model grammars as well as statistical language model grammars. Grammar 118 can be stored in a grammar data store 116.

The speech recognition engine 110 can include machine readable instructions for performing speech-to-text conversions, in one embodiment, the speech recognition engine 110 can be implemented within a clustered server environment, such as within a WEBSPHERE computing environment. Engine 110 can also be implemented within a single server, within a desktop computer, within an embedded device, and the like. The various components of system 100 can be implemented within the same computing space, or within other remotely located spaces, which are communicatively linked to the engine 110.

In one embodiment, the data store 116 can include a plurality of grammars, which are selectively activated. For example the data store 116 can include context dependent grammars and/or speaker dependent grammars, which are selectively activated depending on conditions of the system 100. Accordingly grammar 118 can be a context dependent grammar a context independent grammar, a speaker dependent grammar, and a speaker independent grammar, or a context independent grammar depending upon implementation specifies for system 100.

Further, the data store 116 can include grammar-based language model grammars and statistical language model grammars. The grammar-based language model grammars can be written in any language including, but not limited to, a NUANCE Grammar Specification language (GSL), a Speech Recognition Grammar Specification (SRGS) compliant language, and a JAVA Speech Grammar Format (JSGF) compliant language.

As speech recognition engine 110 executes, instance data 122 associated with the speech recognition runs can be placed in log data store 120. The instance data 112 can include audio containing speech utterances, speech-converted text, confidence scores for a recognition instance, a context for the recognition instance, and other such data.

The training data store 130 can be an additional repository in which training data is stored. The training data can be generated from the instance data 122 or can be independently obtained. The training data can include speech utterances and associated transcribed text. The text can represent desired results for when the speech utterances are speech-to-text converted.

The grammar enumerator 140 can access the log data store 120 and/or the training data store 130 and can generate a set of words and phrases 150 contained therein. This set of words and phrases 150 can be further processed by the weighing engine 142. The weighing engine can determine a relative frequency of use for each of the words and phrases from data stored in data stores 120 and/or 130, which is used to generate weighed set 152. Set 152 can be conveyed to a grammar generator 144, which uses the weighed set 152 to generate a replacement grammar 154. The replacement grammar 154 can be a statistical language model grammar and the data contained in data stores 120 and/or 130 can be used as a speech corpus for the grammar 154.

Performance analyzer 146 can then compare relative performance of replacement grammar 154 against performance data for corresponding grammar 118. Depending upon the results of the comparisons, a grammar replacement action can be triggered. If so, grammar swapper 148 can replace grammar 118 with grammar 154.

In one embodiment, grammar 118 can be stored within data store 149 for a designated trial time. Operational performance metrics can be captured for the replacement grammar 154 during this trial time. It is possible that the replacement grammar 154 performs worse than the original speech recognition grammar 118 even though performance analyzer 146 predicted improved performance. If operational performance of replacement grammar 154 is worse than the original grammar, the grammar swapper 148 can exchange grammars 118 and 154.

Another reason to store the original speech recognition grammar 118 in data store 149 (assuming grammar 118 is a grammar-based language model grammar) is that manual tuning of grammar 118 can occur subsequently to the swap. Once manually tuned, grammar 118 can have better performance metrics than those of replacement grammar 154. In which case, the grammars can be re-swapped using grammar swapper 148.

Data stores 116, 120, 130, and 149 can be a physical or virtual storage spaces configured to store digital content. Each of the data stores 116, 120, 130, and 149 can be physically implemented within any the of hardware including, but not limited to, a magnetic disk, an optical disk, a semiconductor memory, a digitally encoded plastic memory, a holographic memory, or any other recording medium. Further, each data store 116, 120, 130, and 149 can be a stand-alone storage unit as well as a storage unit formed from a plurality of physical devices. Additionally, content can be stored within data stores 116, 120, 130, and 149 in a variety of manners. For example, content can be stored within a relational database structure or can be stored within one or more files of a file storage system, where each file may or may not be indexed for information searching purposes. Further, the data stores 116, 120, 130, and 149 can utilize one or more encryption mechanisms to protect stored content from unauthorized access.

Components of system 100 can be communicatively linked via one or more networks (not shown). The networks can include any hardware/software/and firmware necessary to convey digital content encoded within carrier waves. Content can be contained within analog or digital signals and conveyed through data or voice channels. The networks can include local components and data pathways necessary for communications to be exchanged among computing device components and between integrated device components and peripheral devices. The networks can also include network equipment, such as rooters, data lines, hubs, and intermediary servers which together form a packet-based network, such as the Internet or an intranet. The networks can further include circuit-based communication components and mobile communication components, such as telephony switches, modems, cellular communication towers, and the like. The networks can include line based and/or wireless communication pathways.

Figure 2:
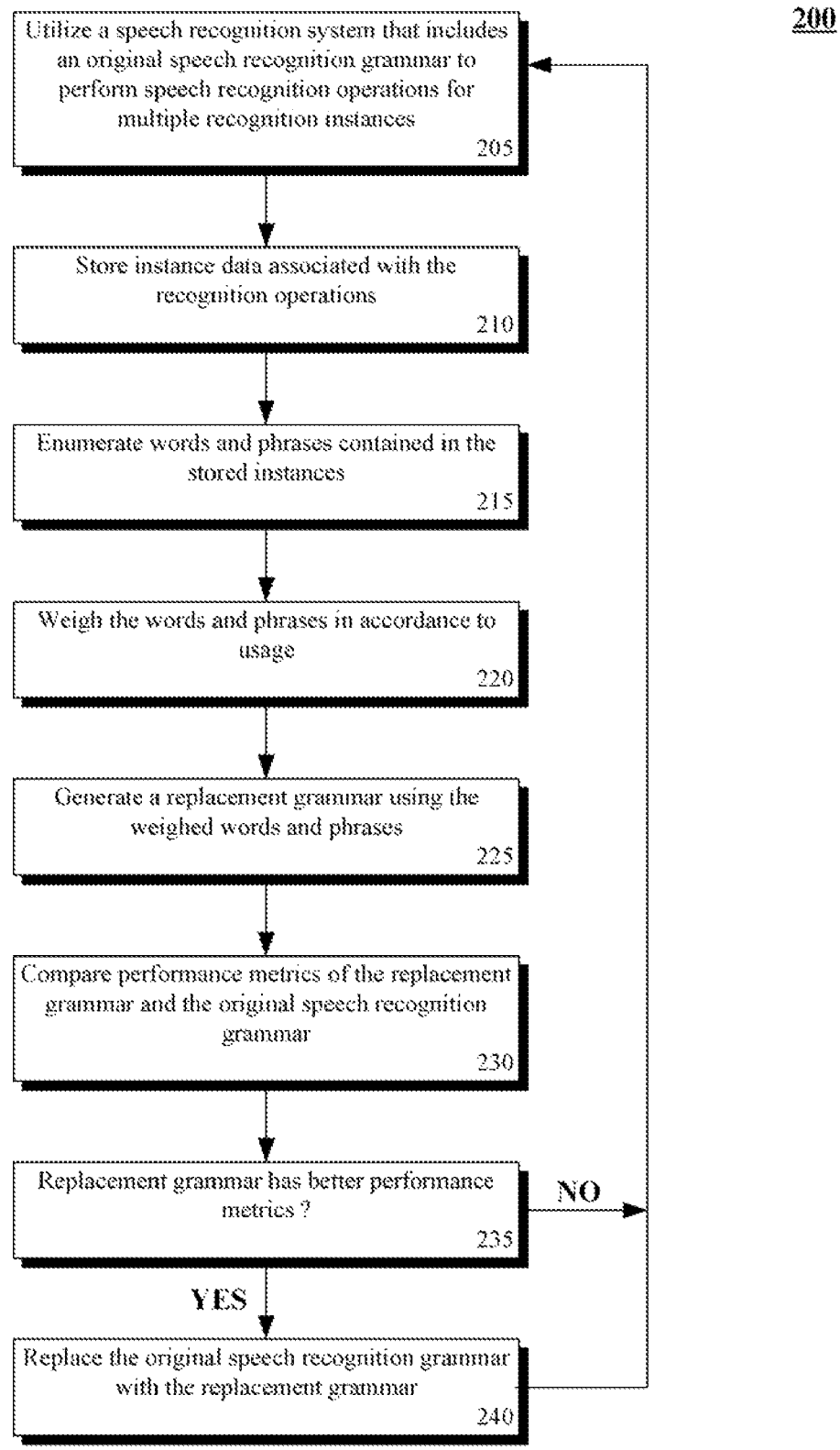
FIG. 2 is a flow chart of a method for tuning speech recognition grammars in accordance with an embodiment of the inventive arrangements disclosed herein.

FIG. 2 is a flow chart of a method 200 for tuning speech recognition grammars in accordance with an embodiment of the inventive arrangements disclosed herein. The method 200 can be performed in the context of a system 100 or any other speech recognition system that utilizes speech recognition grammars.

Method 200 can begin in step 205, where a speech recognition system can be utilized to perform speech recognition operations for multiple recognition instances. The speech recognition system can use an original speech recognition grammar when performing the operations. The speech recognition grammar can be a grammar-based language model grammar or a statistical language model grammar. In step 210, instance data associated with the recognition operations can be stored in a data store.

In step 215, words and phrases contained in the data store can be enumerated. In step 220, the words and phrases can be weighed. The recognition instance data can be used to determine relative usage frequency for weighing purposes. In step 225, a replacement grammar can be generated using the weighed words and phrase. The replacement grammar can be a statistical language model grammar.

In step 230, performance metrics of the replacement grammar can be compared against performance metrics of the original speech recognition grammar. For example, the data store can include a training set of audio. The training set of audio can be automatically generated from the recognition instances and/or can be a standard training step with known results. The comparisons of step 230 can compare confidence scores generated by the grammars and/or can compare generated results against manual transcriptions of the training set.

In step 235, a determination can be made as to whether the replacement grammar has better performance metrics than the original speech recognition grammar. If not, the method can loop to step 205, where further recognition instances can be performed using the original speech recognition grammar. Because accuracy of a statistical language model grammar can increase with a larger training corpus and because a statistical language model grammar is generated specifically for a training corpus, the method 200 can be performed iteratively with potentially varying results.

If the performance metrics of the replacement grammar are better than those of the original speech recognition grammar, the method can proceed from step 235 to step 240, where the original speech recognition grammar can be replaced. Replacement can occur automatically and/or based upon a manual selection depending upon implementation specifics. The method can loop from step 240 to step 205, where it can repeat. Thus a speech recognition grammar can be continuously tuned as recognition instance data changes.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A speech processing method comprising acts of:
   utilizing an original speech recognition grammar in a speech recognition system to perform first speech recognition operations for a plurality of recognition instances,
   the original speech recognition grammar being a grammar-based language model grammar, the first speech recognition operations comprising using the original speech recognition grammar to process first audio data that represents speech utterances;
   storing instance data generated based on the first speech recognition operations performed using the original speech recognition grammar;
   automatically generating a replacement grammar from the stored instance data, comprising determining, based on at least in part the stored instance data, a number of times at which at least one word or phrase was recognized in the first speech recognition operations, wherein the replacement grammar is a statistical language model grammar;
   selectively replacing the original speech recognition grammar in the speech recognition system with the replacement grammar; and utilizing the replacement grammar to perform second speech recognition operations comprising processing second audio data;
generating additional instance data based on the second speech recognition operations;
tuning the replacement grammar based on the additional instance data.

2. The method of claim 1, wherein the original speech recognition grammar is written in a grammar format specification language selected from a group of languages consisting of a NUANCE Grammar Specification Language (GSL), a Speech Recognition Grammar Specification (SRGS) compliant language, and a JAVA Speech Grammar Format (JSGF) compliant language.

3. The method of claim 1, further comprising an act of:
comparing a performance of the original speech recognition grammar against the replacement grammar, wherein the act of selectively replacing the original speech recognition grammar is contingent upon results of the act of comparing, and wherein replacement of the original speech recognition grammar selectively occurs when the performance of the replacement grammar favorably compares to the performance of the original speech recognition grammar.

4. The method of claim 3, wherein the replacement of the original speech recognition grammar is performed automatically and dynamically when the performance of the replacement grammar favorably compares to the performance of the original speech recognition grammar.

5. The method of claim 3, further comprising an act of:
presenting an administrator of the speech recognition system with an option to replace the original speech recognition grammar with the replacement grammar, wherein the replacement of the original speech recognition grammar is contingent upon response provided for the option.

6. The method of claim 1, wherein the speech recognition system comprises a plurality of grammars, which include said original speech recognition grammar.

7. The method of claim 6, wherein the original speech recognition grammar and the replacement grammar are context dependent grammars.

8. The method of claim 6, wherein the original speech recognition grammar and the replacement grammar are speaker dependent grammars.

9. The method of claim 1, wherein the original speech recognition grammar and the replacement grammar are context-independent grammars.

10. The method of claim 1, wherein said acts of claim 1 are performed by at least one machine in accordance with at least one computer program having a plurality of code sections that are executable by the at least one machine.

11. A method comprising acts of:
performing a first plurality of speech-to-text operations using an original speech recognition grammar in a speech recognition system, wherein the original speech recognition grammar is a grammar-based language model grammar, and wherein the first plurality of speech-to-text operations comprise using the original speech recognition grammar to process first audio data that represents speech utterances;
recording recognition instance data generated based on the first plurality of speech-to-text operations performed using the original speech recognition grammar;
automatically creating a set of words and phrases from the recorded recognition instance data;
automatically generating a replacement grammar from the set of words and phrases, comprising determining, based at least in part on the recorded recognition instance data, a number of times at which at least one word or phrase of the set of words and phrases was recognized in the first plurality of speech-to-text operations, wherein the replacement grammar is a statistical language model grammar;
generating additional instance data based on the second speech recognition operations;
tuning the replacement grammar based on the additional instance data.

12. The method of claim 11, further comprising an act of:
automatically weighing the words and phrases based at least in part on the determined number of times at which the at least one word or phrase was recognized in the first plurality of speech-to-text operations.

13. The method of claim 11, further comprising acts of:
executing replacement speech-to-text operations based upon performance testing input using the replacement grammar;
generating replacement performance metrics based upon the replacement speech-to-text operations;
generating original performance metrics based upon the performance testing input using the original speech recognition grammar; and
comparing the replacement performance metrics and the original performance metrics, wherein the act of replacing is contingent upon results of the act of comparing, wherein the act of replacing selectively occurs when the replacement performance metrics favorably compare to the original performance metrics.

14. A speech recognition system comprising:
a language model processor configured to utilize an original speech recognition grammar in performing first speech recognition operations comprising using the original speech recognition grammar to process first audio data that represents speech utterances, the original speech recognition grammar being a grammar-based language model grammar;
a log data store configured to store speech instance data generated based on the first speech recognition operations performed using the original speech recognition grammar;
a statistical language model generator configured to automatically generate a replacement grammar from the speech instance data at least in part by determining, based at least in part on the speech instance data, a number of times at which at least one word or phrase was recognized in the first speech recognition operations; and
a grammar swapper configured to selectively replace the original speech recognition grammar with the speech replacement grammar, wherein the language model processor is further configured to utilize the replacement grammar to perform second speech recognition operations comprising processing second audio data;
generating additional instance data based on the second speech recognition operations;
tuning the replacement grammar based on the additional instance data.

15. The system of claim 14, wherein the original speech recognition grammar is written in a grammar format specification language selected from a group of languages consisting of a NUANCE Grammar Specification Language (GSL), a Speech Recognition Grammar Specification (SRGS) compliant language, and a JAVA Speech Grammar Format (JSGF) compliant language.

16. The system of claim 14, wherein the original speech recognition grammar and the replacement grammar are context dependent grammars.

17. The system of claim 14, further comprising:
a performance analyzer configured to compare a performance of the original speech recognition grammar with a performance of the replacement grammar, wherein actions taken by the grammar swapper are contingent upon results of comparisons performed by the performance analyzer.

18. At least one computer readable recording non-transitory medium having encoded thereon instructions that, when executed by at least one processor, perform a speech processing method comprising acts of:
utilizing an original speech recognition grammar in a speech recognition system to perform first speech recognition operations for a plurality of recognition instances, the original speech recognition grammar being a grammar-based language model grammar, the first speech recognition operations comprising using the original speech recognition grammar to process first audio data that represents speech utterances;
storing instance data generated based on first speech recognition operations performed using the original speech recognition grammar;
automatically generating a replacement grammar from the stored instance data, comprising determining, based at least in part on the stored instance data, a number of times at which at least one word or phrase was recognized in the first speech recognition operations, wherein the replacement grammar is a statistical language model grammar;
selectively replacing the original speech recognition grammar in the speech recognition system with the replacement grammar; and
utilizing the replacement grammar to perform second speech recognition operations comprising processing second audio data;
generating additional instance data based on the second speech recognition operations;
tuning the replacement grammar based on the additional instance data.

19. The at least one computer readable recording non-transitory medium of claim 18, wherein the act of automatically generating a replacement grammar comprises acts of:
automatically creating a set of words and phrases from the stored instance data; and automatically generating the replacement grammar from the set of words and phrases.

20. The at least one computer readable recording non-transitory medium of claim 19, further comprising an act of:
automatically weighing the words and phrases based at least in part on the determined number of times at which the at least one word or phrase was recognized in the first speech recognition operations.

21. The at least one computer readable recording non-transitory medium of claim 19, further comprising acts of:
executing replacement speech recognition operations based upon performance testing input using the replacement grammar;
generating replacement performance metrics based upon the replacement speech recognition operations;
generating original performance metrics based upon the performance testing input using the original speech recognition grammar; and
comparing the replacement performance metrics and the original performance metrics, wherein the act of selectively replacing the original speech recognition grammar is contingent upon results of the act of comparing, wherein replacement of the original speech recognition grammar selectively occurs when the replacement performance metrics favorably compare to the original performance metrics.

22. A speech processing method comprising acts:
utilizing an original speech recognition grammar in a speech recognition system to perform speech recognition operations for a plurality of recognition instances, the original speech recognition grammar being a grammar-based language model grammar, the speech recognition operations comprising using the original speech recognition grammar to process audio data that represents speech utterances and was not used in generating the original speech recognition grammar;
storing instance data generated based on the speech recognition operations performed using the original speech recognition grammar;
automatically generating a replacement grammar from the stored instance data, comprising determining, based at least in part on the stored instance data, a number of times at which at least one word or phrase was recognized in the speech recognition operations, wherein the replacement grammar is a statistical language model grammar;
and selectively replacing the original speech recognition grammar in the speech recognition system with the replacement grammar;
generating additional instance data based on the second speech recognition operations;
tuning the replacement grammar based on the additional instance data.

23. A speech recognition system comprising:
a language model processor configured to utilize an original speech recognition grammar in performing speech recognition operations comprising using the original speech recognition grammar to process audio data that represents speech utterances and was not used in generating the original speech recognition grammar, the original speech recognition grammar being a grammar-based language model grammar;
a log data store configured to store speech instance data generated based on the speech recognition operations performed using the original speech recognition grammar;
a statistical language model generator configured to automatically generate a replacement grammar from the speech instance data at least in part by determining, based at least in part on the speech instance data, a number of times at which at least one word or phrase was recognized in the speech recognition operations; and
a grammar swapper configured to selectively replace the original speech recognition grammar with the speech replacement grammar;
generating additional instance data based on the second speech recognition operations;
tuning the replacement grammar based on the additional instance data.

24. At least one computer readable recording non-transitory medium having encoded thereon instructions that, when executed by at least one processor, perform speech processing method comprising acts of:
utilizing an original speech recognition grammar in a speech recognition system to perform speech recognition operations for a plurality of recognition instances, the original speech recognition grammar being a grammar-based language model grammar, the speech recognition operations comprising using the original speech recognition grammar to process audio data that represents speech utterances and was not used in generating the original speech recognition grammar;

storing instance data generated based on the speech recognition operations performed using the original speech recognition grammar;

automatically generating a replacement grammar from the stored instance data, comprising determining, based at least in part on the stored instance data, a number of times at which at least one word or phrase was recognized in the speech recognition operations, wherein the replacement grammar is a statistical language model grammar;

and selectively replacing the original speech recognition grammar in the speech recognition system with the replacement grammar;

generating additional instance data based on the second speech recognition operations;

tuning the replacement grammar based on the additional instance data.

* * * * *